June 2, 1953 J. SUNNEN 2,640,256
VALVE GUIDE DRIVER
Filed May 3, 1948 3 Sheets-Sheet 1
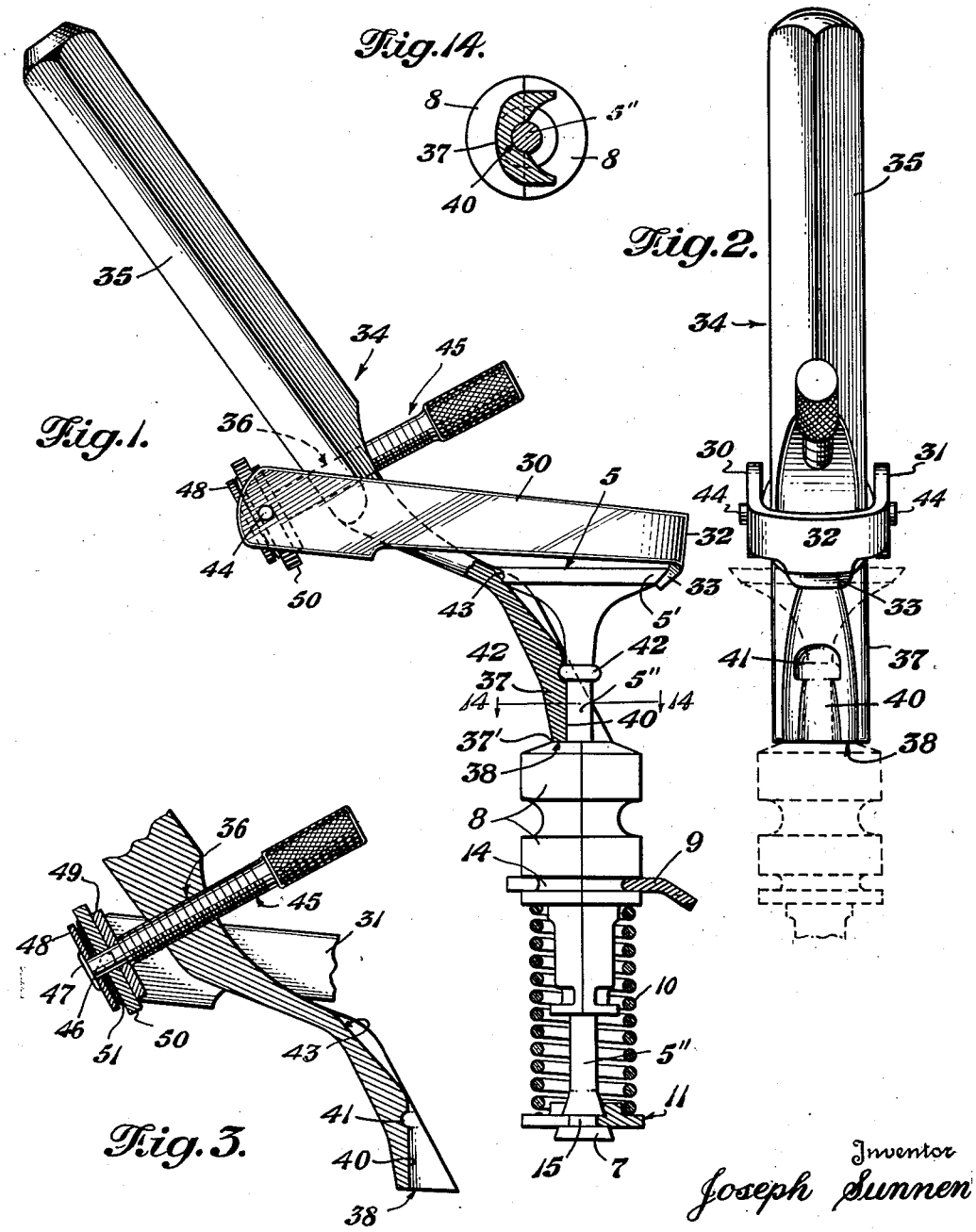

Inventor
Joseph Sunnen,
By George R. Ericson

June 2, 1953      J. SUNNEN      2,640,256
VALVE GUIDE DRIVER
Filed May 3, 1948      3 Sheets-Sheet 3
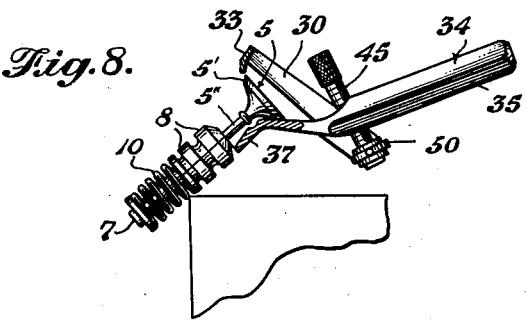
Fig. 8.
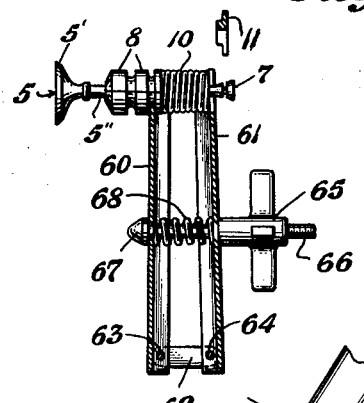
Fig. 9.
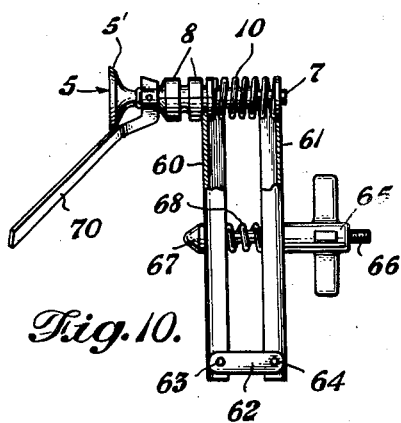
Fig. 10.
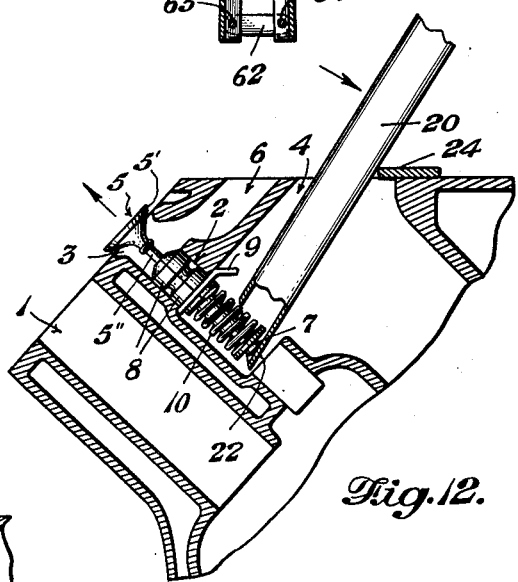
Fig. 12.
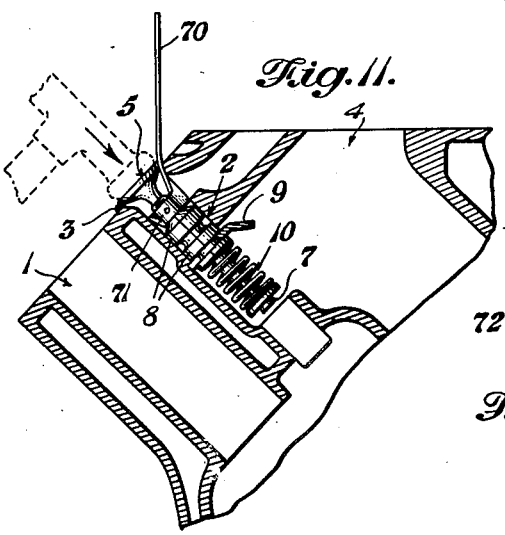
Fig. 11.
Fig. 13.
Inventor
Joseph Sunnen,
By George R. Ericson Patented June 2, 1953

2,640,256

UNITED STATES PATENT OFFICE 2,640,256

VALVE GUIDE DRIVER

Joseph Sunnen, Clayton, Mo.

Application May 3, 1948, Serial No. 24,717

6 Claims. (Cl. 29—213)

This invention relates to the construction of a lifter set and the method of its use and is particularly designed for the removal and replacement of the valve assembly of the VL-48 Ford motor, although basically adaptable for use in connection with other types of motors having assemblies of the same general character.

The removal and replacement of the valve assembly of the VL motor is extremely difficult and time-consuming unless special equipment is provided for these operations. This equipment may include a lift bar having provision for the initial lifting of the valve by direct engagement with the spring assembly as well as the final jacking movement resulting from direct engagement with the valve stem after the valve has been partially lifted and access to the valve stem becomes available. Additional equipment, and the basic element of the present set, is the valve guide driver which includes an adjustable clamp for engaging about the valve head, and a driving element so constructed and arranged as to permit the application of a blow simultaneously to both sections of the valve guide, whereby these sections are released from the walls of the openings in the motor casing provided for their reception and wherein they become locked due to corrosion, oxidation and the like as a result of variations in temperature and continued use over relatively long periods of time. After the release of the sectional valve guide from its retaining wall as a result of a blow on the valve guide driver, and the removal of the guide lock, which permits the removal of the entire valve assembly, additional means are provided in the form of a spring compressor which enables the operator to remove the valve keepers and permit separation of the component parts of the valve assembly.

In keeping with the foregoing, one of the objects of the invention is to provide a reversible lift bar which is capable of a dual use so as to permit direct engagement with the spring to jack the spring or direct engagement with the valve stem to continue the valve jacking operation.

Another object of the invention is to provide a valve guide driver including means for clamping the same into position about the valve head, and means permitting repeated use of the device with a single adjustment.

Another object of the present design of valve guide driver is to so construct the driving end that it will inherently align itself axially with the valve stem to permit the application of force in the proper direction, this force being applied to both sections of the valve guide due to the design and shape of the striking face which is such as to straddle the joint between the valve guide sections when properly positioned.

Other features of the present invention will more clearly hereinafter appear by reference to the accompanying drawings and specification wherein like characers of reference designate corresponding parts throughout the several views, in which:

Figure 1 is a side elevation, partly in section, showing the valve guide driver in position for use on a valve assembly, with the latter removed from the engine;

Figure 2 is an end elevation;

Figure 3 is a fragmentary section showing the adjusting means for the driver parts;

Figure 8 shows the parts removed from the engine with the valve guide driver partially removed as the result of impact against the engine block;

Figure 9 shows the compressor unit with the valve assembly in position and the spring keeper removed;

Figure 10 is a similar view of the spring keeper with a valve prop in position;

Figure 11 shows the valve assembly being replaced with the valve props still in position and the guide lock replaced;

Figure 12 shows a view with the lifter bar in position and raising the valve to permit the removal of the prop;

Figure 13 is a perspective view of the prop structure; and

Figure 14 is a transverse section on line 14—14 of Figure 1.

Figure 4:
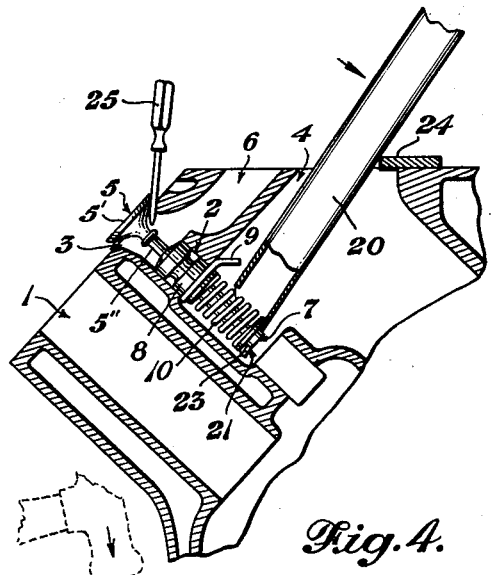
Figure 4 is an elevation showing the first step in the use of the lifter set, with the lifter bar in position for jacking the spring.

In the present disclosure, one cylinder of a VL engine is shown in section with the cylinder bore indicated by reference character 1 and the aligned bore for the valve guide at 2, with the valve seat indicated at 3. It is of course understood that in engines of this type the opposite banks of cylinders radiate from a centrally positioned crank shaft and the valve arrangement for each of the cylinders is intermediate the radially aligned banks of cylinders with provision for access to each valve assembly as shown by the opening 4. The cylinder head is not illustrated, however as is conventional in such structures the cylinder head is provided with an intake or exhaust port controlled by the valve 5 which is adapted to cooperate with the seat 3 to control the flow of fuel mixture or exhaust gases through the passageway 6, the outer end of which is adapted to be associated with a manifold. By an inspection of the engine structure which is disclosed throughout the drawings forming a part of this application, it will be apparent to one skilled in the art that difficulty may be encountered if special provisions were not made for removal and replacement of the valve assembly.

The valve assembly generally includes the valve 5 having beveled face 5', the valve stem 5'' with its tappet end 7, the sectional valve guide 8, the valve guide lock 9, the spring 10, and the spring lock 11. The valve guide is made in two semi-cylindrical sections of the general shape illustrated and with an annular groove 14 about its lower end portion for the reception of the bifurcated lock plate 9, this lock plate preventing vertical movement of the guide sections in their bore and preventing the two sections from becoming relatively displaced. The spring 10 is interposed between the valve guide and the bottom bifurcated valve spring plate or lock 11, this lock 11 being bifurcated as shown to engage the reduced wall portions formed by the annular groove 15 adjacent the tappet end structure. In the cylinder block the wall 2 of the bore receiving the guide section is of such diameter as to provide a rather snug fit for the valve guides and these valve guides have a tendency after use to further bind due to corrosion and oxidation of the oil and vapors when subjected to the heat of the operating engine. It thus becomes a problem to provide equipment which will facilitate the removal of the parts comprising the valve assembly and including the valve guide sections as the removal of this assembly inherently includes a shifting of the valve guide sections axially in both directions, first downwardly towards the tappet end of the assembly to permit removal of the valve guide lock 9 and then vertically to permit jacking of the assembly from its position in the engine structure.

The present lifter set includes several parts, each of which has definite functions in connection with the removal and replacement of the valve assembly and the dissembly of the valve assembly after its removal. As shown in Figure 4 the first operation is a jacking of the valve spring 10 and this is accomplished by the use of a lifter bar 20. This lifter bar being of tubular form and square in cross section and having such a length as to provide sufficient leverage for performing its function. Each end of the lifter bar 20 is diagonally sheared at such an angle as to provide the exposed flat faces 21 and 22, the flat face 21 being provided with an opening 23 of such a diameter as to permit the passage of the tappet ends 7 of the valve assembly while the end 22 presents an uninterrupted surface which will permit engagement with the bottom face of the tappet end of the valve rod 7 when applied to this surface for the various essential operations. This lift bar is utilized in the initial operation necessary for the removal of the valve assembly from the motor by positioning the perforated end 21 so that the tappet end 7 of the valve stem projects through the perforation 23 and thus by swinging the lift bar downwardly clockwise as shown in Figure 4 a jacking operation against the spring tension is provided. It will be noted here that it is desirable to use a protector plate 24 at that part of the engine block which contacts with the lift bar in order to prevent injury to the face and marginal edge of the block. This initial jacking operation unseats the valve as shown in Figure 4 and at this point in the operation a screwdriver or similar implement indicated at 25 can be inserted so that upon removal or release of the lift bar the valve will be retained in partly elevated position. At this point the lifter bar is reversed and the end having the flattened uninterrupted surface is inserted between the valve stem and tappet. When leverage is applied to the lifter bar in this latter position the valve, due to the increased leverage, may be shifted to its fully opened position and it is in this position that the valve guide driver is inserted or positioned as shown in Figure 5.

The construction of this valve guide driver is more clearly shown in Figures 1, 2 and 3 and includes a U-shaped yoke or clamp member formed by the flat parallel arms 30 and 31 connected by the intermediate stirrup section 32 having the inwardly projecting angular lip 33, the inner surface of which being designed to lie in a plane approximating the angle of the valve face 5' so as to snugly engage the same when the assembly is properly adjusted with respect to the driving element 34. The driving element 34 includes a relatively heavy elongated impact shank portion 35 formed with transversely extending threaded openings 36 at the inner end of the shank portion and downwardly curved anvil extremity 37 which lies mainly in a plane intersecting the plane of the shank 35. The inner end of the heel 37' of the anvil extremity 37 is located approximately at a point defined by a line extending through the longitudinal center of the shank 35 so that a hammer blow on the impact shank 35 will not tend to cause a lateral force to be exerted against the valve stem 6 but will result in a shock in the direction of the axis of the valve guide upon which the driver rests. The anvil end 37 of the driver is generally of U-form and its bottom face 38, when in use, lies in a horizontal plane and flush with the upper face of the guide element 8. In this position the inner face of the lip 33 of the clamp element is flush with and in locking engagement with the beveled face 5' of the valve 5. The central vertical portion 40 of the anvil end 37 of the driver is designed to seat snugly about and embrace that portion of the valve stem 5'' adjacent the driving end structure and this face 40 terminates at its upper end in a recess 41 which accommodates the collar 42 formed about the upper end of the valve stem 6. Above the recess 41 the intermediate portion of the driver is shaped for an area of its length substantially longer than the valve thickness, as indicated at 43, with transversely curved face corresponding to the annular face of the valve 5. This curved face 43 is provided in an area of the shank which will be diametrically opposite to the inclined lug or projection 33 so that between the curved face of the lug 33 and the face 43 of the shank of the driver a snug clamping action about the valve face will be accomplished by adjustment of yoke 30 and the yoke supporting rod or carrier screw member 45.

The arms 30 and 31 of the yokes are formed at their free ends with aligned openings for receiving the transverse pivot pins 44, these pivot pins radiating from opposite sides of the disc or plate 50 and the plate 50 and pins 44 forming a pin connection between the arms. The plate 50 is formed with a central opening through which the reduced end 46 of the rod or screw 45 extends. The rod or screw 45 is adapted to be threaded through the opening 36 formed immediately below the shank 35 of the driver. The area about the opening 36 is relatively thick and heavy to provide sufficient strength in the structure where it has been drilled to receive the adjusting screw 45. The end of the yoke supporting adjusting screw 45 is reduced as at 46 and is peened at its end to form a head 47 to provide therebetween an area for the arrangement of the washers 48 and 49 intermediate of which is arranged the disc 50 carrying the pivot pins 44. A friction spring 51 is provided between the outer washer 48 and the disc 50 to provide locking means for the threaded shank 45 of the adjusting member. By this arrangement the arcuate movement of the yoke carrying the lip 33 can be adjusted so that this lip 33 will snugly engage and lie parallel with the valve face 5. It will be noted that as a result of the above described construction a hammer blow on the driver shank 35 will not transfer substantial stresses in any direction other than in the direction of the axis of the valve guide and any relative motion between the associated parts due to impact on the shank 35 will be compensated for due to the novel construction and arrangement of parts and the tool will remain and tend to hold more firmly on the valve guide rather than be displaced by the impact.

Figure 5:
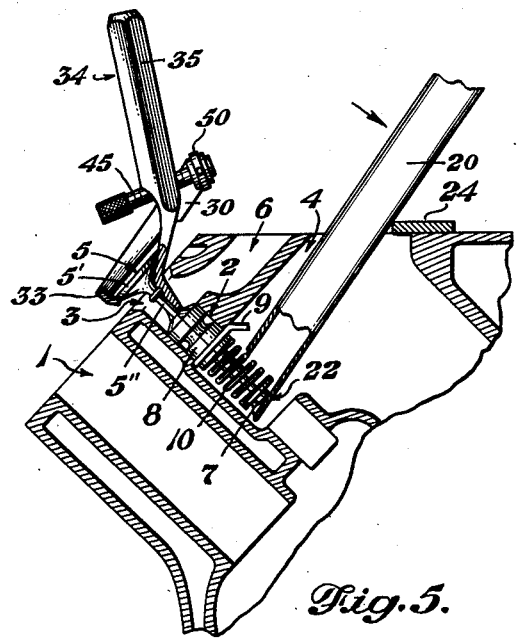
Figure 5 is a side elevation showing the lifter bar reversed for engaging the valve stem and the valve guide driver in position.
Figure 6:
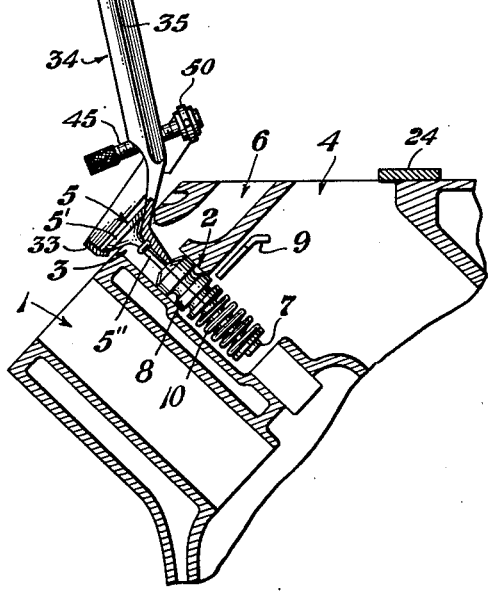
Figure 6 is a similar view showing the position of the parts after application of a blow on the valve guide driver, with the lock removed.
Figure 7:
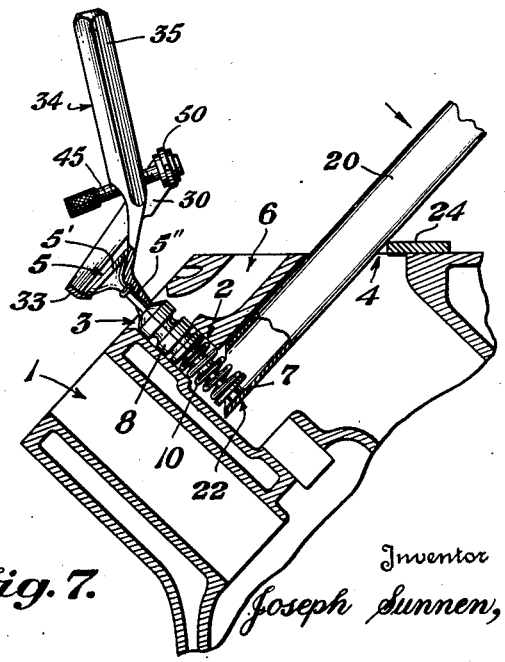
Figure 7 shows the parts being removed from the valve bore in the engine block by the application of power from the lifting bar.

Thus it will be seen by reference to Figure 5 that with the valve elevated by use of the lifter bar and its flattened end 22, the driver can be arranged in position by swinging the clamp so that the lip 33 engages one side of the valve face 5′ while the other side is engaged by the annular medial face 43 of the driver structure. Accurate clamping is of course obtained by adjustment of the adjusting screw 45 and when the device is in position a sharp hammer blow applied as shown in Figure 6 will result in simultaneous downward movement of both the valve guide sections 8 to such a position that the valve guide locks 9 can be removed as shown in this figure. When this lock is removed the end 22 of the lifter bar 20 is again inserted between the valve stem and proper leverage applied to force the assembly outwardly as shown in Figure 7, the limit of the outward movement being determined by the freedom of movement of the lifter bar 20 as defined by the adjacent inner walls of the motor structure. It is of course necessary that the movement of the bar 20 to remove the valve assembly be ample to enable the entire valve assembly to be removed as shown in Figure 8.

When the valve assembly unit has been removed as shown in Figure 8 this assembly can be removed from the driver by striking a light blow against the block. When removed from the driver the parts can be dissembled by the use of the clamp shown in Figure 9. This clamp includes two jaws 60 and 61, each jaw being of U form in cross section with its side walls suitably spaced to receive therebetween the spring 10 of the assembly. The two jaws 60 and 61 are connected in spaced parallel relation by the link 62, which link is pivoted at 63 and 64 to the outer ends of the jaws. The free ends of the jaws are bifurcated, the free end of jaw 60 having its ends spaced to snugly engage the wall defining the annular groove 14 which normally receives the lock plate 9 of the split sleeve guide structure. The jaw 61 of the clamp is bifurcated to slide freely about the valve stem 6, permitting alignment of the valve assembly in the clamp. The seating of the bifurcated jaws in their respective positions is such as to provide ample area for applying pressure by means of the hand nut 65 which is threaded onto the shank of the adjusting screw 66 which extends medially through the two jaws 60 and 61 and is formed with the enlarged head 67 and intermediate spring 68. The spring 68 is positioned on the bolt 66 intermediate the jaws 60 and 61 and normally tends to expand the two jaws to the extent permitted by the adjustment of the hand nut 65. The valve assembly when removed as shown in Figure 8 is positioned with the jaw 60 engaging in the annular groove 14 of the valve guide and the jaw 61 engaging about the shank of the valve stem 6 and intermediate the spring 10 and the spring seat 11. When so positioned the clockwise rotation of the hand nut 65 will compress the spring 10 and free the valve seat 11, and when these parts are removed all of the elements of the valve assembly are free for dissembly to permit cleaning or replacement of parts. Upon reassembly, the compressor is shown as used in Figures 9 and 10 and a valve prop is placed about the upper portion of the valve stem immediately below the bead 42. The valve prop comprises a shank 70 having an offset semi-annular portion 71 with a flattened end portion 72, the portion 71 may be slightly in excess of a semi-annular form to provide a spring clip effect. The structure is made of spring steel and is adapted to seat about and clip the valve stem immediately below the annular projection 42 and between this projection and the top of valve guide 8 and is used as shown in Figure 11 for holding the assembly as it is inserted and driven into position. Due to the fact that the valve prop is made of relatively thin spring steel, the assembly can be driven down to substantially the valve seating position. When so positioned the lifter bar can be used as illustrated in Figure 3 to engage the bottom of the valve stem to force the valve upwardly a sufficient distance to permit the removal of the prop, it being understood that before this operation the lock 9 for the valve guide sections is driven into place to prevent displacement under the thrust of the lifter bar 20. After this operation, the removal of the lifter bar leaves the valve assembly in proper position for normal function and operation. It will be noted that in replacing the assembly the prop 70—71 is clamped to the valve rod 5″, between the guide 8 and the bead 42, under tension of the valve spring 10, and this spring tension is relieved when the guide lock 9 is moved into position.

In the present structure it will be noted that the shank portion of the lifter element which is provided with the arcuate face 43 for receiving a portion of the valve face 5′ is relatively thin. The relative thinness of this shank is necessary in order to permit insertion of the tool and movement of the tool between the face of valve 5′ and its seat 3. Obviously under impact there will be a tendency for the driving element to shift with respect to the yoke, these parts being pivoted for relative swinging movement. A substantial relative shifting of the yoke and of the driver might result in a release of the clamp on the valve or at least distortion of the clamp face 43 on the yoke. By having the arcuate area 33 extend a substantial distance along the shank of the driving tool with the thickness of the shank decreasing upwardly toward the shank end all stresses which might be otherwise present are eliminated and the driving tool is retained in position on the anvil end of the structure. The collar 42 on the valve is adapted to seat in a recess in the adjacent face of the driving tool so that the driving tool remains fixed and clamped between the collar and the upper ends of the split valve guide. Upon a hammer blow on the impact end 35 of the driving tool it is to be expected that the guide sections 8 will shift downwardly as shown in Figure 6, in which position the valve guide lock 9 can be slid outwardly as shown by reference character 9 in this Figure 6. When this lock 9 has been removed the spring 10 will tend to urge the valve guide sections upwardly, however because of the anvil end of the driver and the cooperation between the collar 42 and the recess in the driving face, the valve guide sections are prevented from exploding upwardly, being retained in relatively fixed position in relation with the present device so that the entire valve assembly can be removed as shown in Figure 8. When removed, a blow on an adjacent fixed element such as the engine block will cause a slight rotary motion of the anvil end of the driving tool so that the anvil end of the driving tool will swing on its pivoted support 45 and become disengaged from the valve guide structure leaving this structure free to separate or explode, thus releasing the valve assembly parts and permitting removal of the spring and of the spring lock.

It is believed with the disclosure of the drawings not only are the various details of construction clear and obvious, but also the step by step use of the device and its related accessories.

What I claim is:

1. In a device of the character described, a driving tool including an elongated shank terminating at one end in an anvil portion, said anvil portion being formed with an upper transverse concave face for receiving a portion of a valve face, and a lower adjacent vertical slot for receiving a portion of a valve stem, a yoke member having a valve engaging face, and a member supported by said driving tool above said concave valve engaging face, said member being adjustable transversely of said tool shank and having an end portion thereof pivotally connected to said yoke at a point spaced from its valve engaging face.

2. In a device of the character described, a driving tool including an elongated shank terminating at one end in an anvil portion, said anvil portion being formed with an upper transverse concave face for receiving a portion of a valve face, a yoke member of U-form pivotally supported at its free end portions by said shank for lateral adjustment with respect thereto, the arms of said yoke being arranged at each side of said shank, and the bottom edge of the base portion of said yoke including a valve engaging face.

3. In a device of the character described, a driving tool for displacing sectional valve guides of a valve assembly for an internal combustion engine to permit removal of the guide lock, said driving tool including a shank having an impact end and terminating at the other end in an anvil portion, said anvil portion being downwardly turned with respect to the longitudinal axis of the shank and terminating in a bottom face for engaging the upper face of valve guides, said down turned portion being formed in one face with a vertical valve stem receiving groove, a transversely arcuate valve engaging recess formed in said tool above said vertical groove for engaging one side of a valve, a transversely adjustable clamp supporting member supported by said driving tool above said arcuate recess and transversely adjustable with respect to said tool, a clamping element pivoted to one end portion of said member on a horizontal axis, said clamping element having a valve engaging face and being laterally adjustable with respect to said shank upon transverse adjustment of said supporting member to position the valve engaging face of the clamping element into clamping association with the opposite side of the valve.

4. In a valve guide driver, a driving tool including a shank portion having an impact end, an anvil portion at the opposite end of said shank portion, a valve engaging recess formed in said driving tool adjacent the anvil end portion, a yoke including a pair of spaced arms and an intermediate valve engaging portion, a pivot pin connection between the end portions of said yoke arms, a yoke support means rotatably connected to said pivot pin connection and threaded into said shank above said recess for adjustably connecting said driving tool and yoke to permit movement of said pin connection and yoke laterally of said tool, whereby a valve may be clamped between the valve engaging recess formed in the driving tool and the valve engaging portion of said yoke.

5. In a driving tool, an elongated body having an impact end and an anvil end portion, a valve engaging seat formed in said body, a supporting member carried by said body and adjustable transversely thereof, a plate on one end of said member, pivot pins at each end of said plate, a generally U-shaped clamp member having its free ends mounted for swinging movement on said pivot pins, the base of said clamp member being provided with a valve engaging projection, and means for locking said supporting member against transverse movement with respect to said body.

6. In a driving tool, an elongated body having an impact end and an anvil end portion, an elongated transversely arcuate valve engaging seat formed in said body, a supporting member carried by said body and adjustable transversely thereof, a plate swiveled on one end of said member, pivot pins fixed at each end of said plate, a generally U-shaped clamp member having its legs straddling said elongated body and the extremities of said legs mounted for hinged movement on said pivot pins, the base of said clamping member being provided with an in-turned valve engaging lip, and means carried by said plate for locking said supporting member against transverse movement with respect to said body.

JOSEPH SUNNEN.

References Cited in the file of this patent

UNITED STATES PATENTS

| Number | Name | Date |
| --- | --- | --- |
| 1,879,333 | Kulp et al. | Sept. 27, 1932 |
| 1,948,243 | Sunnen | Feb. 20, 1934 |
| 1,998,547 | Kulp et al. | Apr. 23, 1935 |
| 2,089,902 | Kulp | Aug. 10, 1937 |
| 2,277,346 | Nichols | Mar. 24, 1942 |